United States Patent [19]

Dauvergne

[11] 4,336,818
[45] Jun. 29, 1982

[54] SHOCK ACTIVATED SHUT-OFF VALVE

[76] Inventor: Hector A. Dauvergne, P.O. Box 884, San Leandro, Calif. 94577

[21] Appl. No.: 222,037

[22] Filed: Jan. 2, 1981

[51] Int. Cl.³ ............................................. F16K 17/36
[52] U.S. Cl. ..................................... 137/38; 137/271
[58] Field of Search .............................. 137/38, 39, 43

[56] References Cited

U.S. PATENT DOCUMENTS 252,958 1/1882 McDonnell ........................... 137/38
3,965,917 6/1976 Speck .................................. 137/38

FOREIGN PATENT DOCUMENTS 893280 4/1962 United Kingdom .................. 137/38

Primary Examiner—Robert G. Nilson
Attorney, Agent, or Firm—Bielen & Peterson

[57] ABSTRACT

A gas valve for attachment to a gas line for preventing flow of gas subsequent to a vibration shock of a predefined limit, the valve having a ball and pedestal trip mechanism wherein the ball, in set position on the pedestal, supports a lever connected to a flap closure which drops to a closed position on displacement of the ball from the support pedestal, the valve having a reset mechanism and multiple support pedestals for selection of a desired strength setting.

10 Claims, 4 Drawing Figures

SHOCK ACTIVATED SHUT-OFF VALVE

BACKGROUND OF THE INVENTION

The gas valve of this invention relates to a shutoff valve for use where earthquakes or other shocks may cause a break in a gas line resulting in a hazard from explosion and/or fire upon ignition of escaped gas. The problem of fire following an earthquake is one of the most serious and damaging aspects of a major earthquake. A major portion of the damage following the San Franscisco quake of 1906 resulted from the fires following the tremors rather than from the structural damage of the shock. The fires were undoubtedly caused to a large extent by gas line breaks and subsequent ignition of the escaped gas.

Prior gas valves have been devised using a ball and pedestal arrangement wherein the ball functions as the block-device in the valve. These generally are difficult to reset. The valve devised is designed to operate with a degree of consistence for a preselect disturbance or shock level and to be reset with a minimum of effort.

SUMMARY OF THE INVENTION

The gas valve of this invention is a safety shutoff valve that responds to physical disturbances to automatically activate the closure of a gas line in which it is installed. While the design of the valve is directed particularly at earthquake shocks, the valve is useful in any environment where it is desirable to halt the flow of a dangerous gas during and subsequent to violent shocks. For example, in military installations or in war zones, where the gas line is not a strategic necessity, it is desirable to shut down such gas lines when under bomb or shell attack. Similarly, in other natural disasters in addition to earthquakes, for example, tornado or destructive hurricane, it is desirable to shut down the gas to prevent possible subsequent fire.

The gas valve is constructed with a cast housing having an inlet line connection and an outlet line connection with standard gas line conduit. The cast housing has an internal elongated cavity in which a heavy ball is mounted on a support pedestal. The support pedestal is designed with a cradle that supports the ball so long as conditions are stable. The ball in turn supports a lever which is connected to and extends from a flap gate that is displaced from an orifice seat. The ball when disturbed drops from the pedestal a short distance, which is adequate to lower the lever and attached flap gate onto the orifice seat, thereby closing the gas passage through the valve. The valve remains closed by the weight of the flap valve and the back pressure of the gas. By design and orientation of the lever, the ball is displaced to a specific secondary location where it is embraced by a reset device comprising an externally accessible plunger connected to a guiding contact face. When the plunger is pressed the ball, when guided by the inside configuration of the housing chamber, is repositioned onto the pedestal support. The pedestal support is easily accessible by removal of an end plug whereby the pedestal support can be substituted by a pedestal support of slightly different geometry for increasing or descreasing the sensitivity of the valve to shock or vibration.

These and other features will become apparent upon consideration of the detailed description of the preferred embodiment.

DETAILED DESCRIPTION OF THE PREFERRED EMBODIMENT

Figure 1:
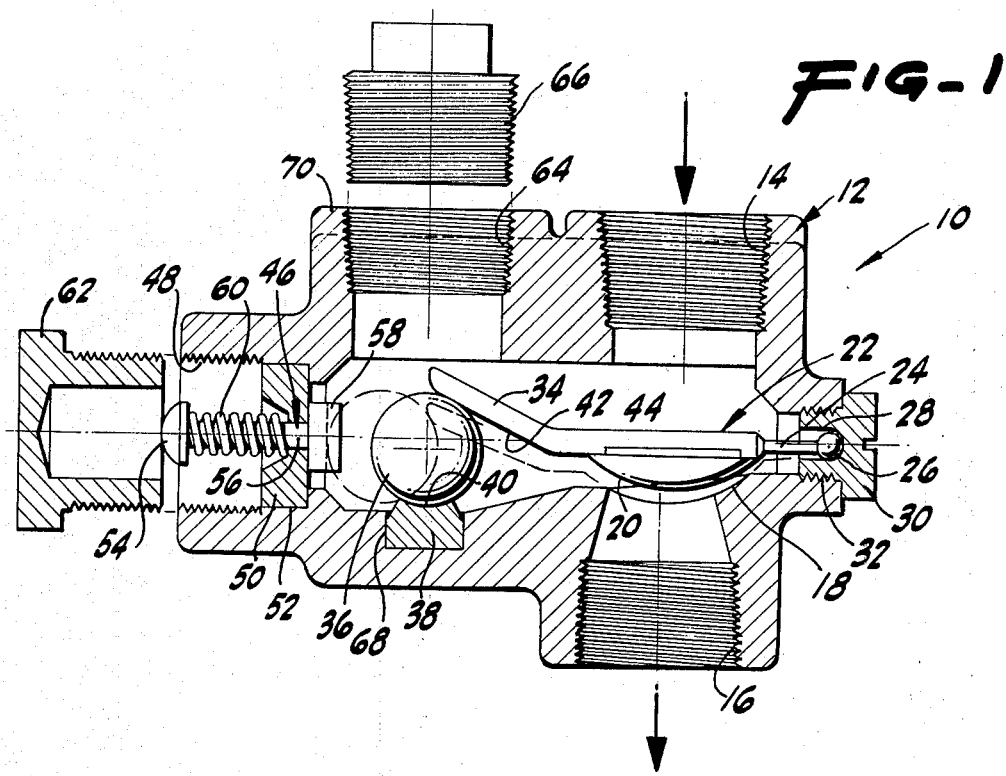
FIG. 1 is a top view partially in phantom of the valve.
Figure 2:
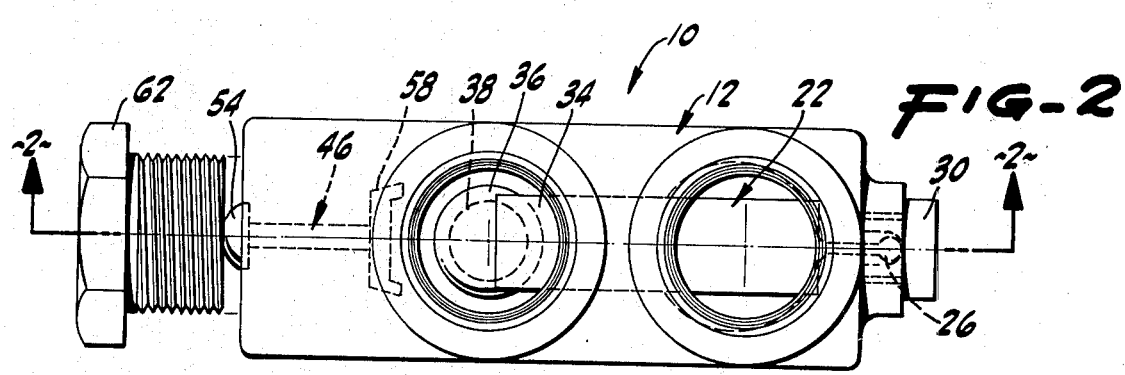
FIG. 2 is a cross sectional, elevational view taken on the lines 2—2 in FIG. 1.

Referring to FIGS. 1 and 2, the gas valve, designated generally by the reference numeral 10, is constructed with an elongated cast metal housing 12. The housing 12 is machined with a threaded inlet connection orifice 14 for a gas conduit, i.e. a threaded steel pipe and an opposed threaded outlet connection orifice 16 for a continuation of the conduit. The housing is designed for installation in a vertical run of gas conduit. While it may be redesigned for a horizontal gas line, the vertical orientation provides the most effective arrangement of internal components for minimal size.

Referring in particular to FIG. 2, the outlet orifice 16 has an internal orifice seating 18 which cooperates with a spherically contoured seal surface 20 on the underside of an elongated flap gate 22. The flap gate 22 includes a tongue 24 with an enlarged pivot ball 26 which is positioned in a support recess 28 in an end plug 30. The threaded end plug 30 is engaged with a threaded housing hole 32 at one end of the valve.

Oppositely directed from the pivot tongue 24 and integrally formed in the flap gate 22 is an upwardly sloped activating lever 34 which contacts a relatively large ball 36, preferably fabricated from a hard heavy substance such as stainless steel. The ball 36 is seated on a pedestal support 38 having a contoured support surface 40 conforming in part to the surface of the ball.

On shock or heavy vibration the ball 36 is displaced from the pedestal support 38 and directionally urged by the lever 34 of the flap gate 22 to a secondary unseated position as shown in dash line in FIG. 2. The lever 34 has an incline under surface 42 which aids in directing the ball to the secondary position. Location of the ball in this position is also aided by the slope of the internal cavity floor 44. In the unseated position of the ball the lever 34 is out of contact with and no longer supported by the ball 36; the gate 22 having pivoted at the end ball 26 in the plug recess 28 until the seal surface 20 contacts the outlet orifice seating 18. In such position, the flow passage from the inlet orifice 14 through the outlet orifice is effectively closed.

To reset the valve, a plunger 46 oriented in an access orifice 48 is designed to push the ball 36 back up onto the pedestal support 38. The plunger 46 is centrally positioned in the access orifice 48 by an annular bushing seal 50 which is seated in an inset 52 in the access orifice 48. Preferably the bushing seal 50 has a degree of elasticity as well as rigidity to function both as a support and a seal. The plunger 46 has a button head 54, an elongated neck 56 and a contact bracket 58 conforming in part to said ball for capturing and guiding the ball 36 during replacement on the pedestal support when the plunger is pressed. A compression spring 60, contacting the back side of the button head and the outer face of the bushing seal 50, returns the plunger 46 to its original retracted position. While the bushing seal 50 is designed to seal the end orifice 48, to insure that all possibility of gas escape is eliminated, the orifice and seal is capped by end plug 62 for added assurance. This plug (shown removed), when installed also prevents accidental depression of the plunger which may upset the equilibrium of the ball 36.

The end orifice 48 and a machining port 64 at the top of the valve, allow for installation of the internal components. The machining port 64 is closed with a plug 66 and is provided primarily to allow for precision machining of the pedestal support inset 68. The top surface 70 of the machining port is similarly precision machined to provide a surface for leveling the valve on installation for effectively truing the pedestal support 38 to its design performances.

Figure 3A:
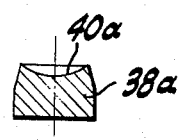
FIG. 3A is a cross sectional, elevational view of a first alternate ball support.
Figure 3B:
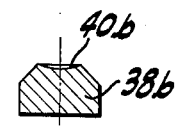
FIG. 3B is a cross sectional, elevational view of a second alternate ball support.

The pedestal support 38 may be replaced with similar pedestal supports 38a and 38b as shown in FIG. 3A and FIG. 3B to change the performance capability of the valve unit. For example, pedestal support 38a provides a contoured support surface 40a that is slightly greater than the support surface 40 of the pedestal support 38 of FIG. 1. This provides a greater stability to the ball 36 and hence requires a greater shock to dislodge the ball and activate the shut-off.

Similarly, the pedestal support 38b has a narrower support surface 40b and provides substantially less stability to the ball 36. A relatively light shock will dislodge the ball and activate the shut-off. While two alternative supports are shown, it is to be understood that a wider selection of supports is to be available for various environmental conditions.

While in the foregoing specification embodiments of the present invention have been shown in considerable detail for the purposes of making a complete disclosure of the invention, it will be apparent to those of ordinary skill in the art that numerous changes may be made in such details without departing from the spirit and principles of the invention.

What is claimed is:

1. A gas valve for attachment to a gas line having a shut-off activated by a vibration shock comprising:
   a. a valve housing having a gas inlet orifice and a gas outlet-orifice;
   b. a flap gate pivotally mounted within said valve housing over said gas outlet orifice;
   c. a ball pedestal support, mounted within said valve housing adjacent said gas outlet orifice; and
   d. a ball supported on said valve housing:
wherein said flap gate has an extending lever contacting substantially the top of the ball and holding the flap gate away from said gas outlet orifice allowing gas passage through said valve and wherein said housing has internal cavity means for accommodating said ball when displaced from said pedestal support upon external vibration shock to said valve, said lever losing contact with said ball and said flap gate sealing said outlet orifice when said ball is so displaced.

2. The gas valve of claim 1 wherein said extending lever on said flap gate has an incline surface means for contacting said ball and directing said ball to said cavity means upon displacement of said ball from said pedestal support.

3. The gas valve of claim 1 wherein said valve housing has an internal inset means for removably mounting said pedestal support, said gas valve including a plurality of pedestal supports, each support having a contact surface, each contact surface having different dimensional characteristics for varying the degree of stability of said ball on a select support installed in said inset means.

4. The gas valve of claim 1 having further a reset means for repositioning a ball that has been displaced from said pedestal support back onto said support.

5. The gas valve of claim 4 wherein said reset means comprises a plunger having an externally manipulatable push-button and an internal ball contact means for displacing said ball on pressing said push-button.

6. The gas valve of claim 5 wherein said reset means is constructed with a compression spring for retracting said plunger and said ball contact means comprises an internally located bracket element conforming in part to said ball wherein said ball is guided to said pedestal support.

7. The gas valve of claim 1 wherein said housing has an end access orifice and a bushing seal, said plunger being centrally mounted in said bushing seal.

8. The gas valve of claim 7 wherein said housing has an end plug capping said end access orifice and reset means.

9. The gas valve of claim 1 wherein said flap gate has a contoured seal surface and said outlet orifice has a seating conforming to said seal surface of said flap gate on contact of said flap gate and said seal surface.

10. The gas valve of claim 1 wherein said flap gate has an end tongue with a pivot ball and said housing has an internal support recess in which said end tongue and ball are positioned for pivoting said flap gate.

* * * * *